(12) United States Patent
VandeBerg

(10) Patent No.: US 7,597,009 B1
(45) Date of Patent: Oct. 6, 2009

(54) AIRFLOW SENSOR APPARATUS

(75) Inventor: Noel D. VandeBerg, Bellville, WI (US)

(73) Assignee: Venturedyne, Ltd., Pewaukee, WI (US)

( * ) Notice: Subject to any disclaimer, the term of this patent is extended or adjusted under 35 U.S.C. 154(b) by 0 days.

(21) Appl. No.: 12/178,196

(22) Filed: Jul. 23, 2008

(51) Int. Cl.
*G01F 1/46* (2006.01)

(52) U.S. Cl. .................................. 73/861.66

(58) Field of Classification Search .......... 73/861.65, 73/861.66, 861.22; 244/207; 454/335
See application file for complete search history.

(56) References Cited

U.S. PATENT DOCUMENTS

| | | | |
|---|---|---|---|
| 4,297,900 A | 11/1981 | Brandt, Jr. | |
| 4,444,060 A | 4/1984 | Yamamoto | |
| 4,453,419 A | 6/1984 | Engelke | |
| 4,481,829 A | 11/1984 | Shortridge | |
| 4,602,514 A | 7/1986 | Kurrle et al. | |
| 4,735,100 A | 4/1988 | Hajto | |
| 4,770,035 A * | 9/1988 | Kolkebeck et al. ............ | 73/195 |
| 4,912,973 A | 4/1990 | Milewski et al. | |
| 5,123,288 A | 6/1992 | Tench et al. | |
| 5,481,925 A | 1/1996 | Woodbury | |
| 5,730,652 A * | 3/1998 | Van Becelaere ............. | 454/335 |
| 5,736,651 A | 4/1998 | Bowers | |
| 5,753,825 A | 5/1998 | Brandt, Jr. | |
| 5,899,416 A * | 5/1999 | Meister et al. ............... | 244/207 |
| 6,189,390 B1 | 2/2001 | Platt | |
| 6,237,426 B1 | 5/2001 | Gryc et al. | |
| 6,487,918 B1 | 12/2002 | DeAngelis | |
| 6,564,651 B1 * | 5/2003 | Bowers .................... | 73/861.66 |
| 2005/0034535 A1 * | 2/2005 | Sprague .................... | 73/861.22 |

OTHER PUBLICATIONS

Titus, AeroCross Flow Sensor Application Guide, Mar. 4, 2002, 7 pages.
Ruskin Air & Sound Control, Ruskin Solutions for Measuring, Maintaining and Controlling Air publication, Jun. 2007, pp. 1-12.

* cited by examiner

*Primary Examiner*—Jewel Thompson
(74) *Attorney, Agent, or Firm*—Michael Best & Friedrich LLP

(57) ABSTRACT

A sensor apparatus for measuring a pressure of an airflow in a duct. The sensor apparatus includes a first sensor portion that includes a first end and a second end, and that is without ports in communication with the airflow. The sensor also includes a second sensor portion that is coupled to the first sensor portion adjacent the first end, and a third sensor portion that is coupled to the first sensor portion adjacent the second end. The second sensor portion includes a first port that senses a first airflow pressure of the airflow, and a second port that senses a second airflow pressure of the airflow. The third sensor portion includes a third port that senses a third airflow pressure of the airflow, and a fourth port that senses a fourth airflow pressure of the airflow.

20 Claims, 11 Drawing Sheets

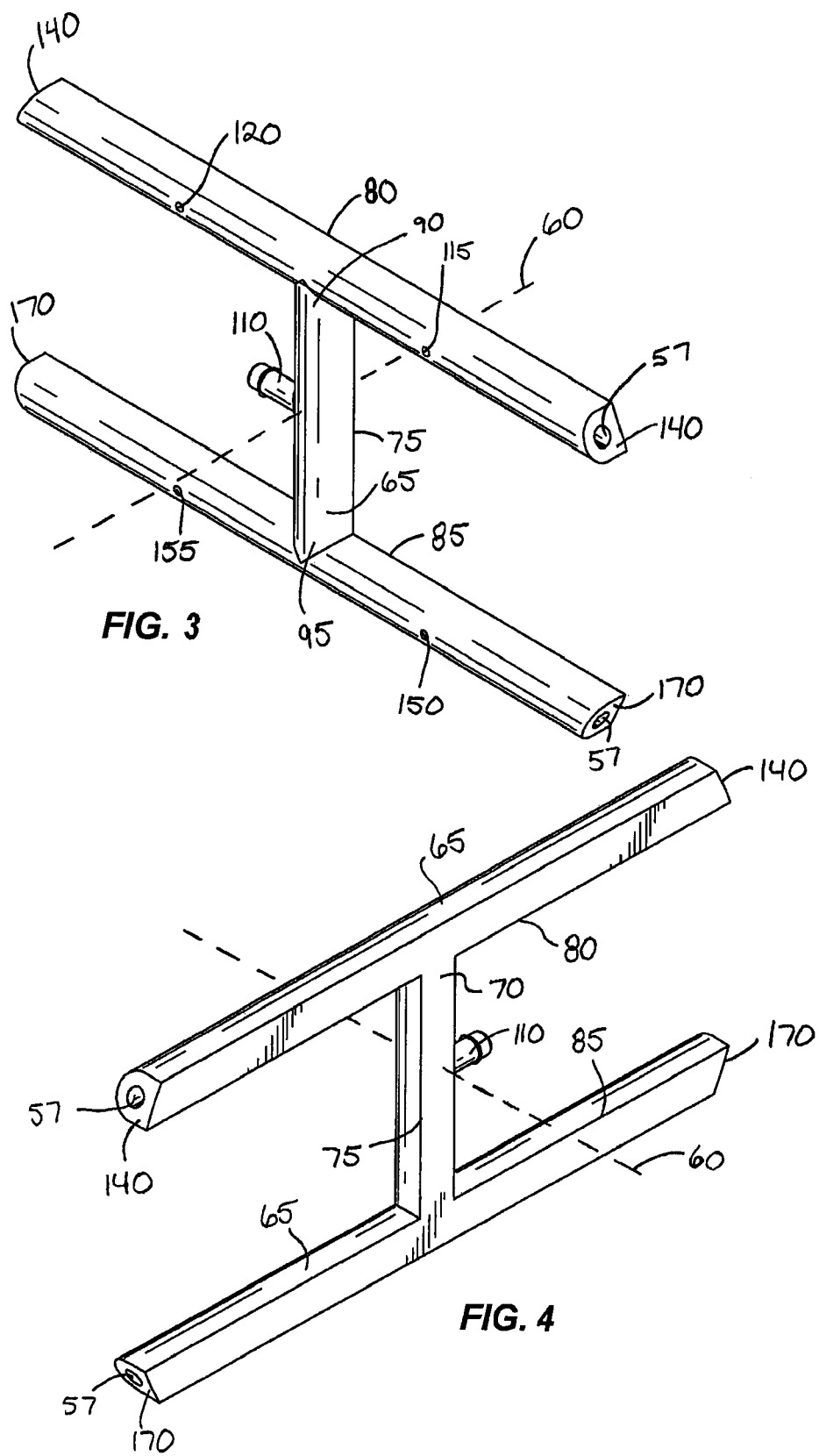

AIRFLOW SENSOR APPARATUS

BACKGROUND

The present invention relates to a sensor apparatus, and more particularly to a sensor apparatus that is positioned in an air duct system to measure airflow by sensing a pressure differential.

Air duct systems are used for heating, cooling, or ventilating controlled spaces by directing an airflow from a source (e.g., furnace, air conditioner, cold or hot air return, etc.) via air ducts to the controlled spaces. In some air duct systems, the airflow is balanced by measuring the airflow in the air duct with an airflow sensing system that is installed in one or more locations in the air duct. In other air duct systems, a portable sensing system can be used to balance the airflow. Often, portable sensing systems include a hood or box that captures the airflow and directs the airflow across a sensing apparatus to measure the airflow.

Generally, an airflow sensing system measures the total pressure and the static pressure of the airflow in the duct. The total and static pressure measurements are used to determine the velocity pressure of the airflow. In some existing air duct systems, the airflow sensing system includes a total pressure sensing tube that measures a total pressure of the airflow, and a static pressure sensing tube that measures the airflow at a stagnation point. The total pressure sensing tube and the static pressure sensing tube are in communication with a controller that determines the airflow based on the measured total and static pressures.

Some existing airflow sensing systems include two or more pressure sensing tubes that are oriented perpendicular to each other (e.g., in a cross-shape). The two pressure sensing tubes are used to measure the total pressure of the airflow. These sensing tubes include one or more airflow ports facing the airflow, and one pressure averaging portion that is positioned at the center or junction of the two pressure sensing tubes (i.e., the intersection of the two sensing tubes). These existing sensing tubes measure the total pressure of the airflow via the airflow ports, and the total pressure of the airflow from each of the holes is averaged at the center pressure averaging portion.

These airflow sensing systems commonly include a static pressure sensing tube that is positioned away from the airflow to sense a static pressure. The total pressure and the static pressure are communicated to the controller, which then calculates the airflow.

SUMMARY

In one construction, the invention provides a sensor apparatus for measuring a pressure of an airflow in an air duct system having a duct with a perimeter wall that defines a centerline of the duct. The sensor apparatus includes a first sensor portion that includes a first end and a second end, and that is without ports in communication with the airflow. The sensor also includes a second sensor portion that is coupled to the first sensor portion adjacent the first end, and a third sensor portion that is coupled to the first sensor portion adjacent the second end. The second sensor portion includes a first port that is operable to sense a first airflow pressure of the airflow, and a second port that is operable to sense a second airflow pressure of the airflow. The third sensor portion includes a third port that is operable to sense a third airflow pressure of the airflow, and a fourth port that is operable to sense a fourth airflow pressure of the airflow.

In another construction, the invention provides a sensor apparatus for measuring a pressure of an airflow in an air duct system. The sensor apparatus includes a duct that is defined by an upstream side and a downstream side and that includes a perimeter wall defining a centerline of the duct extending longitudinally through the duct. The sensor apparatus also includes a first sensor that defines a first axis, and a second sensor that defines a second axis. The first sensor includes a curved surface profile that is positioned in communication with the airflow adjacent the upstream side of the duct, and a substantially planar surface profile defining a back of the first sensor that is disposed opposite the curved surface profile. The first sensor further includes a first plurality of ports that are disposed in the curved surface profile in communication with the airflow to sense airflow pressures. The second sensor includes a curved surface profile that is positioned in communication with the airflow adjacent the downstream side of the duct, and a substantially planar surface profile defining a back of the second sensor and disposed opposite the curved surface profile. The first sensor and the second sensor are positioned adjacent each other in back-to-back relationship within the duct. The second sensor also includes a second plurality of ports in communication with the airflow to sense airflow pressures.

In yet another construction, the invention provides a sensor apparatus for measuring a pressure of an airflow in an air duct system. The sensor apparatus includes a duct, a first sensor, and a second sensor. The duct is defined by an upstream side and a downstream side and includes a perimeter wall. Each of the first sensor and the second sensor is coupled to the perimeter wall and includes a curved surface profile and a planar surface profile that defines a back of the associated sensor. The curved surface profile of the first sensor is in communication with the airflow adjacent the upstream side of the duct, and the curved surface profile of the second sensor is in communication with the airflow adjacent the downstream side of the duct. The first sensor and the second sensor are positioned adjacent each other in back-to-back relationship within the duct. Each of the first sensor and the second sensor also includes a first sensor portion that has a first end and a second end, a second sensor portion that is coupled to the first sensor portion adjacent the first end, and a third sensor portion that is coupled to the first sensor portion adjacent the second end. The first sensor portion is without ports in communication with the airflow. The second sensor portion includes a first port that is in communication with the airflow to sense a first airflow pressure, and a second port that is in communication with the airflow to sense a second airflow pressure. The third sensor portion includes a third port that is in communication with the airflow to sense a third airflow pressure, and a fourth port that is in communication with the airflow to sense a fourth airflow pressure.

Other aspects of the invention will become apparent by consideration of the detailed description and accompanying drawings.

BRIEF DESCRIPTION OF THE DRAWINGS

FIG. 3 is a front perspective view of one of the sensors of FIG. 2.

FIG. 4 is a rear perspective view of the sensor of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, unless specified or otherwise limited, "connected" and "coupled" are not restricted to physical or mechanical connections or couplings.

DETAILED DESCRIPTION

Figure 1:
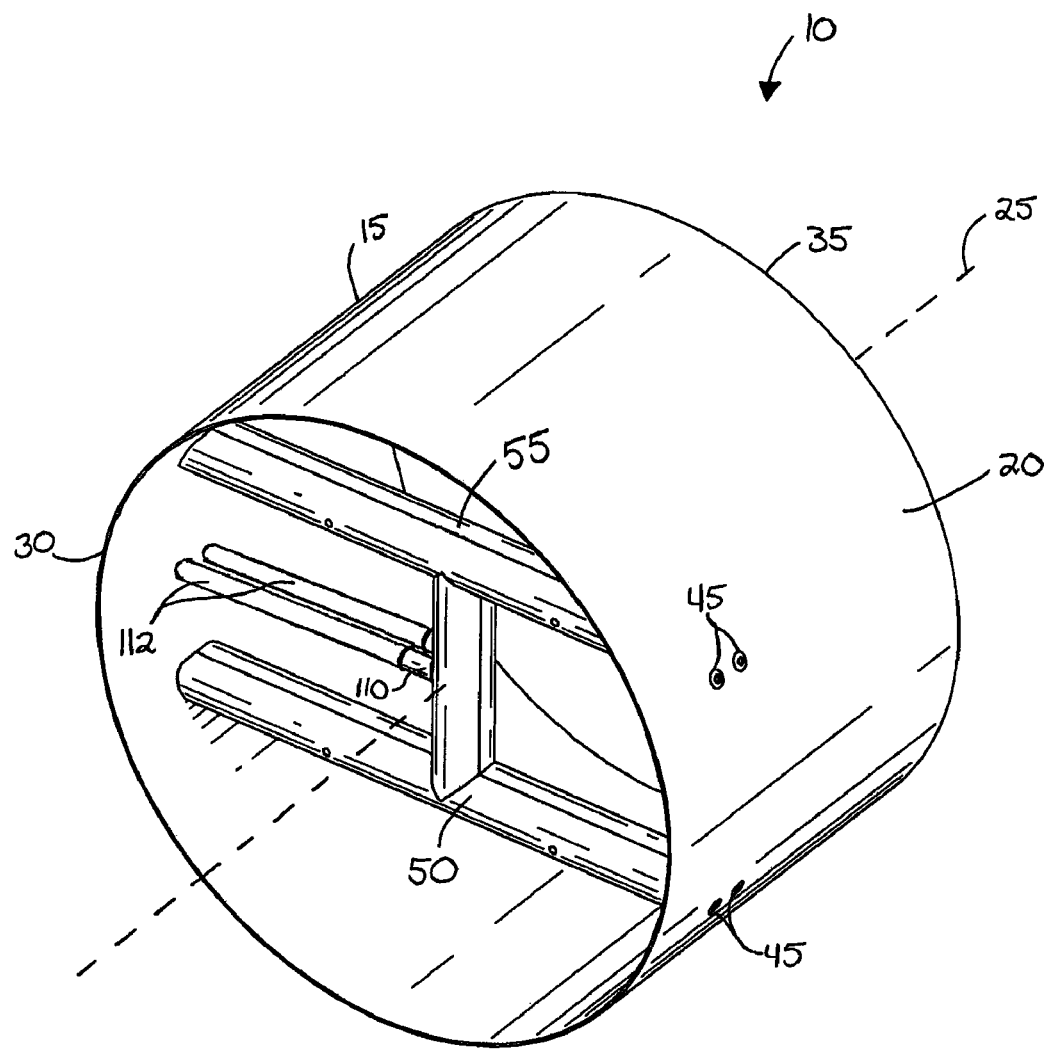
FIG. 1 is a perspective view of a sensor apparatus embodying the present invention.
Figure 2:
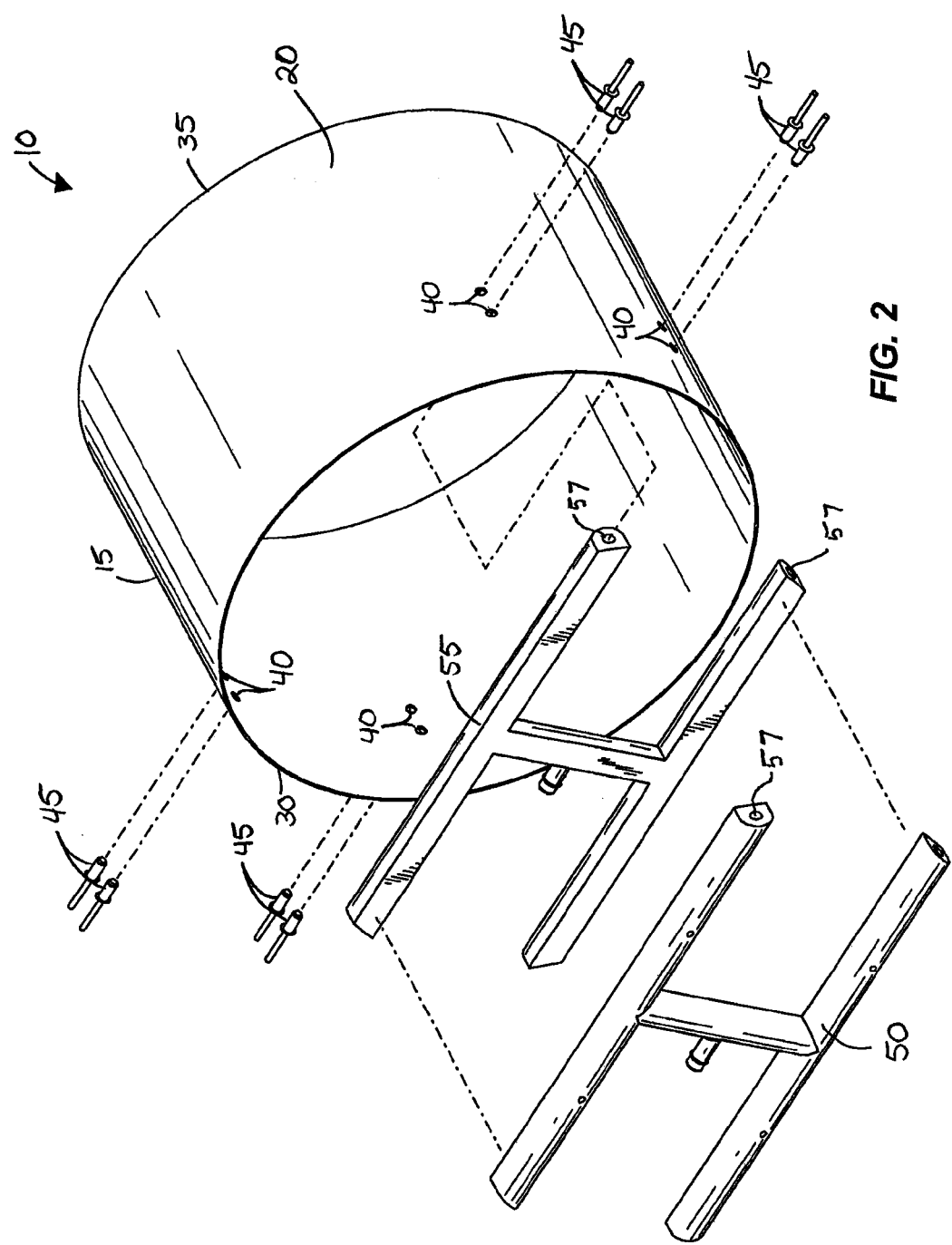
FIG. 2 is an exploded perspective view of the sensor apparatus of FIG. 1 including a duct, a first sensor, and a second sensor.

FIGS. 1 and 2 illustrate a sensor apparatus 10 for use with an air duct system (not shown) that has ducting to direct an airflow to and/or from a controlled space to maintain the controlled space at predetermined conditions. The sensor apparatus 10 includes a box or duct 15 that is attachable to the air duct system, and that includes a perimeter wall 20 that defines an enclosure of the sensor apparatus 10. The duct defines an axis or centerline 25 that extends longitudinally through the center of the duct 15. Generally, the shortest distance from the duct centerline 25 to the perimeter wall 20 is defined as a radius of the duct 15. In the construction of the sensor apparatus 10 that is illustrated in FIGS. 1 and 2, the duct 15 is substantially cylindrical, and the duct radius is the radius of the cylindrical duct 15.

The duct 15 includes a first end 30 that defines an upstream side of the duct 15, a second end 35 that defines a downstream side of the duct 15, and attachment holes 40 that extend through the perimeter wall 20 and that receive fasteners 45. Generally, the first end 30 is positioned in the air duct system in communication with the ducting of the air duct system to receive the airflow from an upstream source (e.g., a furnace, an air conditioner, a hot or cold air return, etc.). The second end 35 is disposed opposite the first end 30, and is positioned in the air duct system in communication with the ducting to distribute the airflow downstream from the sensor apparatus 10 (e.g., toward the controlled space, the furnace, or the air conditioner, etc). In other words, the first end 30 defines an upstream side of the duct 15, and the second end 35 defines a downstream side of the duct 15.

FIG. 1 shows that the sensor apparatus 10 includes a first sensor 50 and a second sensor 55 that are directly attached to the perimeter wall 20 using the fasteners 45. In the illustrated construction, the fasteners 45 are rivets (e.g., pop rivets) that are inserted through the attachment holes 40 and into openings 57 in the ends of the sensors 50, 55 (FIG. 2). In other constructions, the fasteners 45 may be screws, bolts, or other appropriate fastening mechanisms.

The first and second sensors 50, 55 are positioned in the duct 15 adjacent each other, and extend laterally across the opening of the duct 15. The first sensor 50 is oriented in the duct 15 to face the upstream side of the duct 15 to sense a total pressure of the airflow. The second sensor 55 is oriented in the duct 15 to face the downstream side of the duct 15 to sense a static pressure of the airflow. Generally, the second sensor 55 is substantially the same as the first sensor 50, and common elements are given the same reference numerals. Furthermore, the description of the first sensor 50 is exemplary of and applicable to the description of the second sensor 55. Therefore, the second sensor 55 will not be described in detail separately.

FIGS. 3 and 4 show that the first sensor 50 defines an axis 60 that extends substantially perpendicular through a center of the first sensor 50, and that is alignable with the duct centerline 25. In the illustrated construction, the first sensor 50 is symmetrical about the axis 60. FIGS. 5-9 show that the first sensor 50 has an "H"-shaped cross section.

The first sensor 50 includes a curved or arcuate surface profile 65, and a substantially flat or planar surface profile 70 that is disposed opposite the curved surface profile 65 and that defines a back of the sensor 50. With regard to the first sensor 50, the curved surface profile 65 is positioned in the duct 15 in communication with the airflow adjacent the upstream side of the duct 15. The planar surface profile 70 of the first sensor 50 is positioned in the duct 15 toward the downstream side of the duct 15. With regard to the second sensor 55, the curved surface profile 65 is positioned in communication with the airflow adjacent the downstream side of the duct 15. The planar surface profile 70 of the second sensor 55 is positioned toward the upstream side of the duct 15.

In the construction of the sensor apparatus 10 that is illustrated in FIGS. 1 and 2, the planar surface profile 70 of the second sensor 55 is substantially adjacent the planar surface profile 70 of the first sensor 50 such that the first sensor 50 and the second sensor 55 are positioned adjacent each other in a back-to-back relationship.

Figures 8, 9:
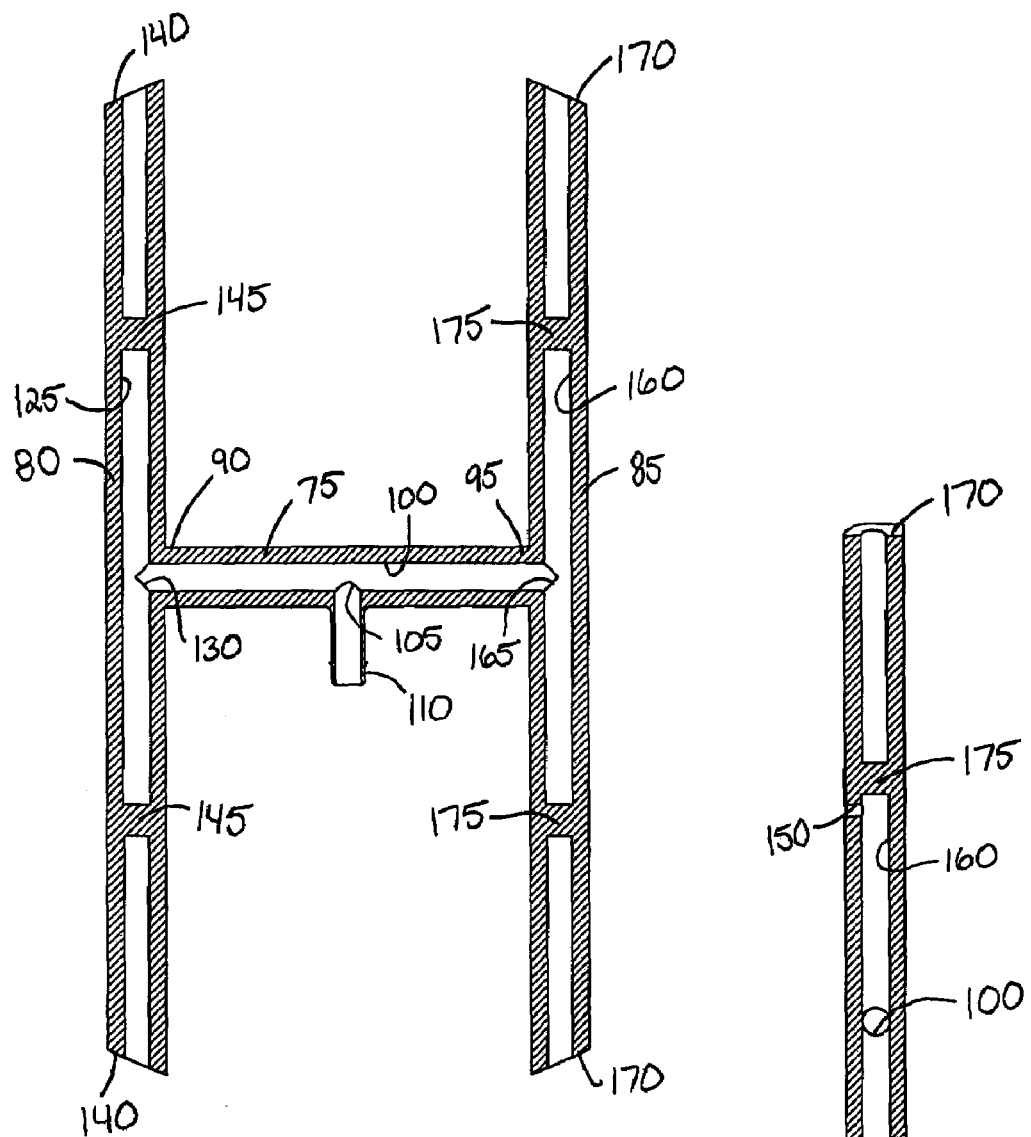
FIG. 8 is a section view of the sensor of FIG. 7 taken along line 8-8.
FIG. 9 is a section view of a portion of the sensor of FIG. 5, taken along line 9-9.

FIGS. 3-5 and 8 show that the first sensor 50 includes a first sensor portion 75, a second sensor portion 80, and a third sensor portion 85. The first sensor portion 75 is without airflow ports, and is positionable across the duct 15 perpendicular to the duct centerline 25. The first sensor portion 75 defines a center of the first sensor 50, and includes a first end 90 that is coupled to the second sensor portion 80, and a second end 95 that is coupled to the third sensor portion 85. FIGS. 8 and 9 show that the first sensor portion 75 includes a first flow path 100 that extends between the first end 90 and the second end 95, and a center pressure averaging portion 105 that is adjacent the center of the first sensor portion 75. The center pressure averaging portion 105 is in communication with an airflow portion 110 that is coupled to a pressure transmitter or output (not shown) that is located outside the perimeter wall 20 via a conduit 112 (FIG. 1).

Figure 5:
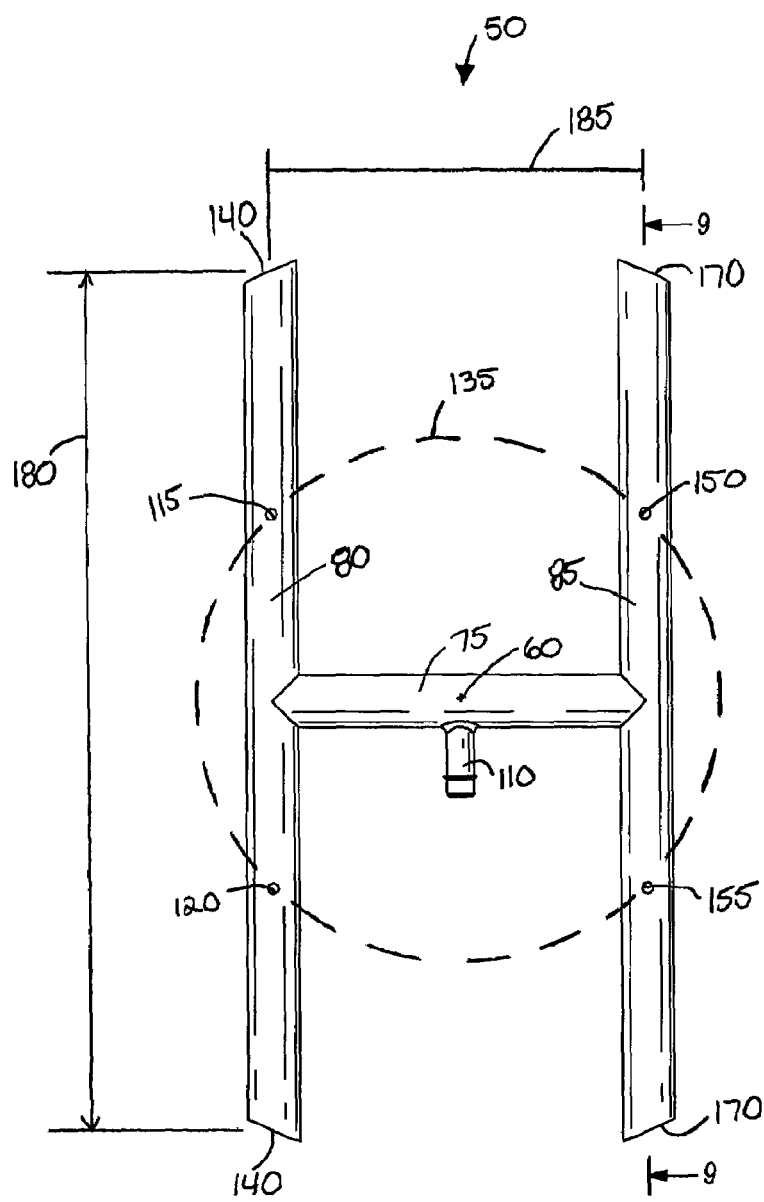
FIG. 5 is a front view of the sensor of FIG. 3.
Figure 6:
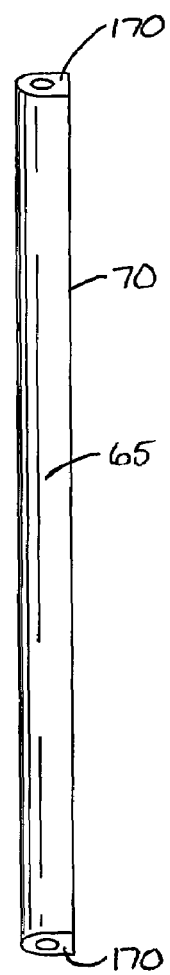
FIG. 6 is a side view of the sensor of FIG. 3.
Figure 7:
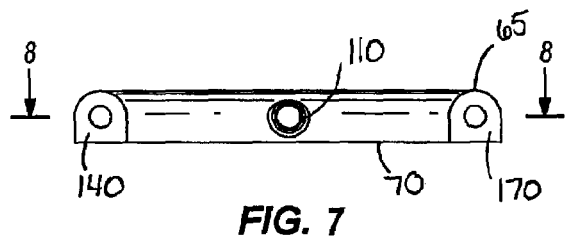
FIG. 7 is an end view of the sensor of FIG. 3.

The second sensor portion 80 extends at a non-zero angle relative to the first sensor portion 75. In the illustrated construction, the second sensor portion 80 is substantially perpendicular to the first sensor portion 75. FIGS. 3, 5, and 8 show that the second sensor portion 80 includes a first port 115, a second port 120, a second flow path 125 that is in communication with the first port 115 and the second port 120, and a first pressure averaging portion 130. As shown in FIG. 7, the first port 115 and the second port 120 are disposed in the curved surface profile 65, and are spaced equidistant from the axis 60 such that a perimeter of a circle 135 having its center on the axis 60 intersects the first port 115 and the second port 120. The first port 115 is in communication with the airflow to sense a first pressure of the airflow. The second port 120 is in communication with the airflow to sense a second pressure of the airflow.

As shown in FIGS. 5 and 8, the second flow path 125 extends between end portions 140 of the second sensor portion 80, and is separated from the end portions 140 by walls 145. The second flow path 125 also is in communication with the first flow path 100 adjacent the first pressure averaging portion 130. The first pressure averaging portion 130 is in communication with the first port 115 and the second port 120 to average the first pressure and the second pressure, and this averaged pressure defines a first averaged airflow pressure that is communicated to the center pressure averaging portion 105 via the first flow path 100.

The third sensor portion 85 extends at a non-zero angle relative to the first sensor portion 75. As illustrated in FIGS. 3-5 and 8, the third sensor portion 85 extends substantially perpendicular to the first sensor portion 75, and substantially parallel to the second sensor portion 80. The third sensor portion 85 includes a third port 150, a fourth port 155, a third flow path 160 that is in communication with the third port 150 and the fourth port 155, and a second pressure averaging portion 165. The third port 150 and the fourth port 155 are disposed in the curved surface profile 65, and are spaced equidistant from the axis 60 such that the perimeter of the circle 135 intersects the third port 150 and the fourth port 155. In other constructions, a circle that intersects the first port 115 and the second port 120 may be larger or smaller than a circle that intersects the third port 150 and the fourth port 155. The third port 150 is in communication with the airflow to sense a third pressure of the airflow. The fourth port 155 is in communication with the airflow to sense a second pressure of the airflow.

As shown in FIGS. 5 and 8, the third flow path 160 extends between end portions 170 of the third sensor portion 85, and is separated from the end portions 170 by walls 175. The third flow path 160 also is in communication with the first flow path 100 adjacent the second pressure averaging portion 165. The end portions 140, 170 are shaped or cut to conform to the shape of the perimeter wall 20. As illustrated in FIGS. 5 and 7, the end portions 140 are generally curved or angled to conform to the cylindrical perimeter wall 20.

The second pressure averaging portion 165 is in communication with the third port 150 and the fourth port 155 to average the third pressure and the fourth pressure sensed by the third and fourth ports 150, 155, respectively. The pressure averaged by the second pressure averaging portion 165 defines a second averaged airflow pressure that is communicated to the center pressure averaging portion 105 via the first flow path 100. The first averaged airflow pressure and the second averaged airflow pressure from the second sensor portion 80 and the third sensor portion 85, respectively, are averaged by the center pressure averaging portion 105. The averaged pressure at the center pressure averaging portion 105 defines a third averaged airflow pressure that can be communicated to the pressure transmitter via the conduit 112.

As illustrated in FIG. 5, the first sensor 50 is defined by a length 180 and a width 185. The length 180 and the width 185 of the first sensor 50 and the second sensor 55 are partially determined by the distance or dimension across the cross-sectional opening defined by the duct 15 between opposed portions of the perimeter wall 20.

The length 180 of the sensor body 115 is also partially determined by the distance between each of the first, second, third, and fourth ports 115, 120, 150, 155 and the perimeter wall 20. In the illustrated construction, each port 115, 120, 150, 155 is located on the sensors 50, 55 so that the respective port is spaced inward from the perimeter wall 20 by a distance that is equal to at least 20 percent of the duct radius. Variations in airflow pressure readings within the duct 15 can be avoided by spacing the ports 115, 120, 150, 155 from the perimeter wall 20 by a distance that is equal to at least 20 percent of the duct radius. In other constructions, the ports 115, 120, 150, 155 may be spaced from the perimeter wall 20 by a distance that is equal to or less than 20 percent of the duct radius. Preferably all ports are spaced at approximately the same distance from a center of the duct.

Generally, the locations of the ports 115, 120, 150, 155 relative to the perimeter wall 20 partially determine the width 185 of the first and second sensors 50, 55. The width of each of the sensors 50, 55 is also partially determined by the size of the duct 15, and by the distance between the duct centerline 25 and the ports 115, 120, 150, 155 (i.e., the radius of the circle 135).

The sensor apparatus 10 illustrated in FIGS. 1 and 2 is assembled by inserting the second sensor 55 into the duct 15 and attaching the end portions 140, 170 of the second sensor 55 to the perimeter wall 20 using the fasteners 45. The axis 60 of the second sensor 55 is substantially aligned with the duct centerline 25 when the second sensor 55 is attached to the duct 15. Next, the first sensor 50 is inserted into the duct 15 and arranged in back-to-back relationship with the second sensor 55 such that the planar surface profile 70 of the first sensor 50 substantially engages the planar surface profile 70 of the second sensor 55. The first sensor 50 is secured to the duct 15 by attaching the end portions 140, 170 of the first sensor 50 to the perimeter wall 20 using the fasteners 45. The axis 60 of the first sensor 50 is substantially aligned with the duct centerline 25 when the first sensor 50 is attached to the duct 15. One end of the conduit 112 is attached to the airflow portion 110, and another end of the conduit 112 extends through the perimeter wall 20 to attach to the pressure transmitter.

In operation, the airflow enters the sensor apparatus 10 from the upstream side of the duct 15, and leaves the duct 15 from the downstream side. The first sensor 50 is oriented in the duct 15 so that the plurality of ports 115, 120, 150, 155 are positioned on the upstream side of the duct 15 in direct communication with the airflow. Each port 115, 120, 150, 155 senses an associated total pressure of the airflow passing through the duct 15. Generally, the airflow pressure sensed by each of the ports 115, 120, 150, 155 of the first sensor 50 can be the same as or different from the pressures sensed by the other ports.

The first airflow pressure and the second airflow pressure that are sensed by the first and second ports 115, 120, respectively, are averaged in the second flow path 125 by the first pressure averaging portion 130. The first averaged total airflow pressure is communicated to the center pressure averaging portion 105 via the first flow path 100. The third airflow pressure and the fourth airflow pressure that are sensed by the third and fourth ports 150, 155, respectively, are averaged in the third flow path 160 by the second pressure averaging portion 165. The second averaged airflow pressure is communicated to the center pressure averaging portion 105 via the first flow path 100, where the first averaged airflow pressure and the second averaged airflow pressure are averaged together to define the third averaged total airflow pressure. The third averaged total airflow pressure is communicated to the pressure transmitter via the conduit 112. Thus, the first sensor 50 includes a tri-pressure averaging feature that accurately measures the total airflow pressure within the duct 15.

The second sensor 55 is oriented in the duct 15 so that the plurality of ports 115, 120, 150, 155 are positioned on the downstream side of the duct 15 in communication with the airflow to measure static pressures of the airflow. Generally, the airflow pressure sensed by each of the ports 115, 120, 150, 155 of the second sensor 55 can be the same as or different from the pressures sensed by the other ports. The static airflow pressures sensed by the ports 115, 120, 150, 155 of the second sensor 55 are averaged in the same manner as the total airflow pressures that are sensed in the first sensor 50, and as such, will not be discussed in detail.

The first averaged airflow pressure and the second averaged airflow pressure sensed by the second sensor 55 are communicated to the center pressure averaging portion 105 via the first flow path 100, and are averaged together to define the third averaged static airflow pressure. The third averaged static airflow pressure is communicated to the pressure transmitter via the conduit 112. Thus, the second sensor 50 includes a tri-pressure averaging feature that accurately measures the static airflow pressure within the duct 15.

Generally, the third averaged total and static airflow pressures that are sensed by the first sensor 50 and the second sensor 55, respectively, are measured by the pressure transmitter to determine a velocity pressure of the airflow. The velocity pressure of the airflow can be adjusted based on the measurements made by the pressure transmitter to deliver an adequate airflow to the controlled space.

Figure 10:
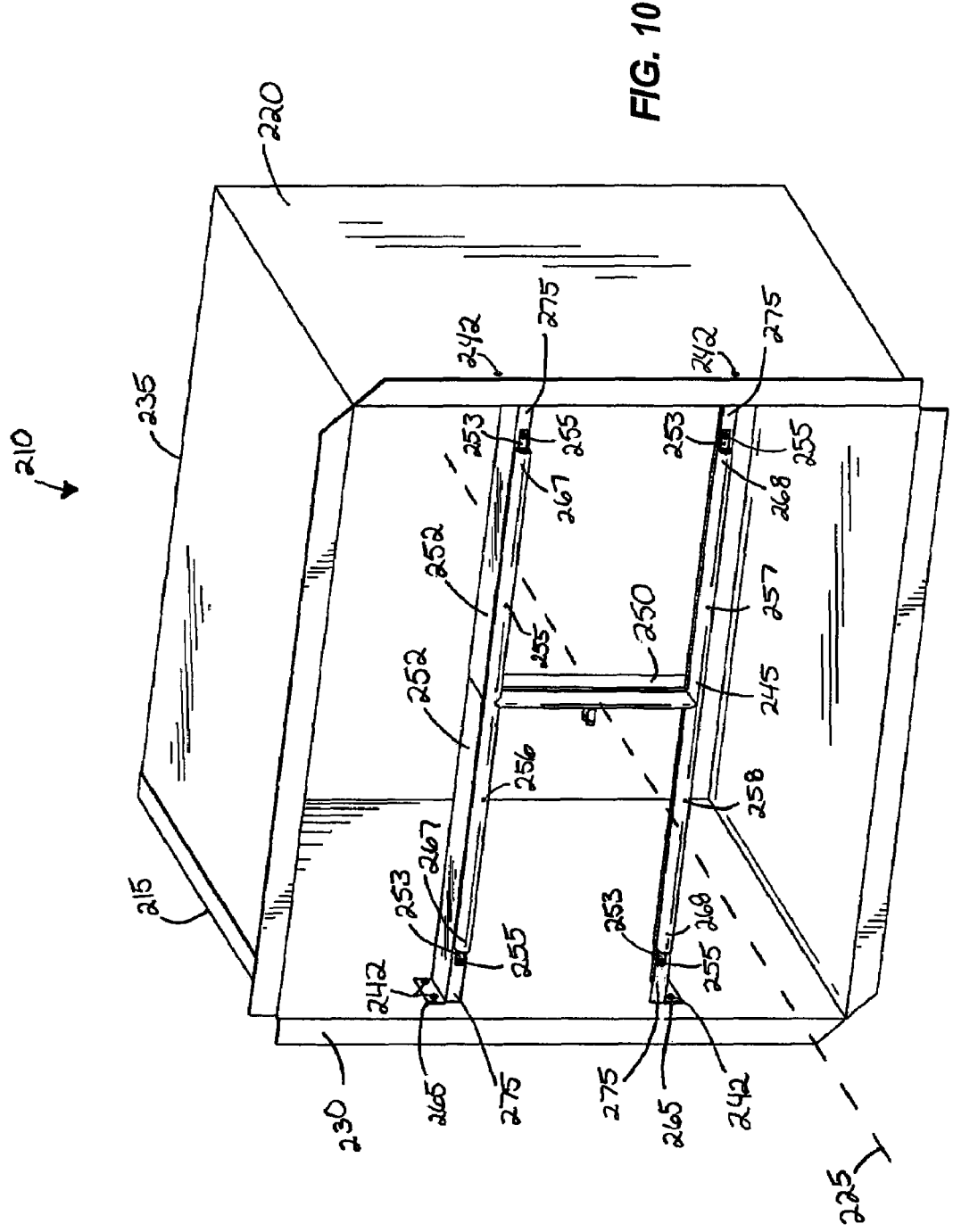
FIG. 10 is a perspective view of another sensor apparatus embodying the present invention.
Figure 11:
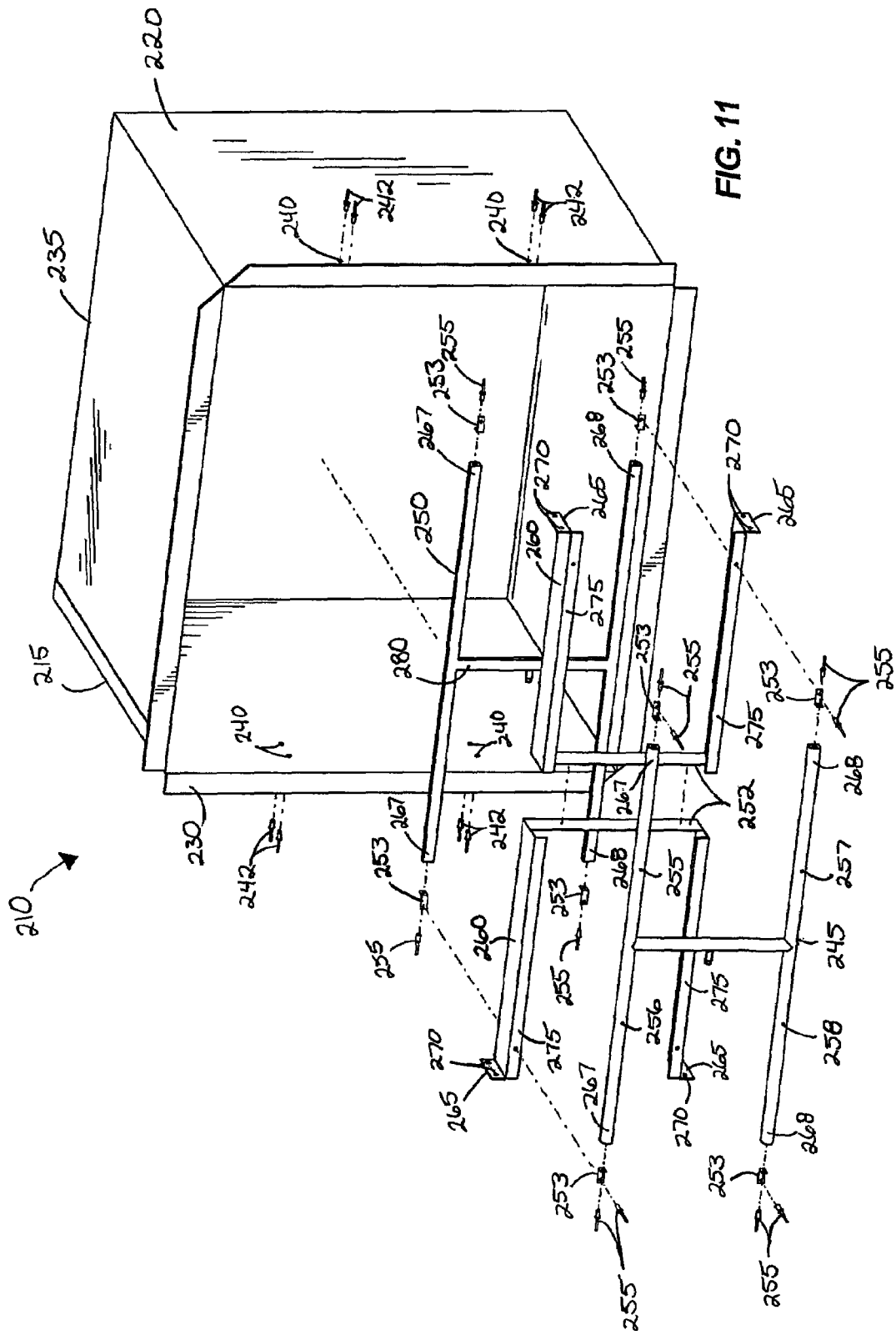
FIG. 11 is an exploded perspective view of the sensor apparatus of FIG. 10 including a duct, the first sensor, the second sensor, and mounting brackets.

FIGS. 10 and 11 illustrate another sensor apparatus 210 for use with an air duct system (not shown) that has ducting to direct an airflow to and/or from a controlled space to maintain the controlled space at predetermined conditions. The sensor apparatus 210 is similar to the sensor apparatus 10 described with regard to FIGS. 1-9.

The sensor apparatus 210 includes a box or duct 215 that is attachable to the air duct system, and that includes a perimeter wall 220 that defines an enclosure of the sensor apparatus 210. The duct 215 defines an axis or centerline 225 that extends longitudinally through the center of the duct 215. Generally, the shortest distance from the duct centerline 225 to the perimeter wall 220 is defined as a radius of the duct 215. In the construction of the sensor apparatus 210 that is illustrated in FIGS. 10 and 11, the duct 215 is substantially rectangular, and the duct radius is the distance between the duct centerline 225 and the closest portion of the perimeter wall 220 (e.g., one-half the width of the duct 215, or one-half the height of the duct 215).

The duct 215 also includes a first end 230 that defines the upstream side of the duct 215, a second end 235 that defines the downstream side of the duct 215, and attachment holes 240 that extend through the perimeter wall 220 and that receive fasteners 242 (e.g., rivets, screws, bolts, or other appropriate fastening mechanisms) that are similar to the fasteners 45. FIGS. 10 and 11 show that the sensor apparatus 210 includes a first sensor 245, a second sensor 250, mounting brackets 252, and angle brackets 253. The first sensor 245 and the second sensor 250 are similar to the first sensor 50 and the second sensor 55, respectively, that are described above with regard to FIGS. 1-9.

Each of the first and second sensors 245, 250 includes a first port 255, a second port 256, a third port 257, and a fourth port 258. The first, second, third, and fourth ports 255, 256, 257, 258 are spaced equidistant from the duct centerline 225 such that a perimeter of a circle having its center on the duct centerline intersects each port 255, 256, 257, 258. In some constructions, the first, second, third, and fourth ports 255, 256, 257, 258 are spaced equidistant from an axis or center of the associated sensor 245, 250 such that a perimeter of a circle having its center on the axis of the associated sensor 245, 250 intersects each port 255, 256, 257, 258. In these constructions, the axis of the associated sensor 245, 250 may be offset from the duct centerline 225.

The mounting brackets 252 and the angle brackets 253 indirectly attach the first sensor 245 and the second sensor 250 to the perimeter wall 220 using the fasteners 242 and fasteners 259 (e.g., rivets, screws, bolts, or other appropriate fastening mechanisms). The mounting brackets 252 are generally "U"-shaped brackets that are attached to each other (e.g., welded, etc.) to provide support in the duct 215 for the first and second sensors 245, 250. The mounting brackets 252 can be formed from sheet metal or other materials that have suitable material properties to support the first and second sensors 245, 250 within the duct 215.

Each of the mounting brackets 252 includes mounting arms 260 that extend toward the perimeter wall 220 generally parallel to each other. Generally, the mounting arms 260 are spaced apart based on the size of the first and second sensors 245, 250, and include feet or bent end portions 265 that are angled to conform to the cross-sectional shape of the perimeter wall 220. The fasteners 242 extend through the attachment holes 230 and through holes 270 in the bent end portions 265 to attach the mounting brackets 252 to the perimeter wall 220.

The mounting arms 260 also include lateral walls 275 and sensor mounting holes 270 that extend through the lateral walls 275. The lateral walls 275 are bent inward from edges of the mounting arms 260 generally toward the center of the duct 15. As shown in FIGS. 10 and 11, the first sensor 245 and the second sensor 250 engage the lateral walls 275 and are attached to the mounting brackets 252 via the angle brackets 253 and the fasteners 259. The angle brackets 253 engage end portions 267, 268 of the sensors 245, 250 and the lateral walls 275. The fasteners 259 attach the angle brackets 253 to the end portions 267, 268 and to the lateral walls 275.

As illustrated in FIGS. 10 and 11, the first and second sensors 245, 250 are positioned in the duct 215 adjacent each other, and extend laterally across the opening of the duct 215. The first sensor 245 is oriented in the duct 215 to face the upstream side of the duct 215 to sense a total pressure of the airflow. The second sensor 250 is oriented in the duct 215 to face the downstream side of the duct 215 to sense a static pressure of the airflow. Planar surface profiles 280 of the first sensor 245 and the second sensor 250 are separately engageable with opposite sides of the lateral walls 275 such that the first sensor 245 and the second sensor 250 are positioned adjacent each other in a back-to-back relationship with the mounting brackets 252 positioned between the first sensor 245 and the second sensor 250. In other words, the mounting brackets 252 are sandwiched between the first sensor 245 and the second sensor 250.

The sensor apparatus 210 illustrated in FIGS. 10 and 11 is assembled by attaching the mounting brackets 252 to each other, and by attaching the bent end portions 265 to the perimeter wall 220 using the fasteners 242. Next, the angle brackets 253 are attached to the end portions 267, 268 of the first and second sensors 245, 250 using the fasteners 259.

Alternatively, the angle brackets 253 can be attached to the mounting brackets 252 via the sensor mounting holes 270 and the fasteners 259 prior to attaching the angle brackets 253 to the end portions 267, 268.

The second sensor 250 is inserted into the duct 215 from the downstream side and is engaged with one side of the lateral walls 275. The first sensor 245 is inserted into the duct 215 from the upstream side and is engaged with the other side of the lateral walls 275. The fasteners 259 are inserted into the sensor mounting holes 270 in the lateral walls 275 and the angle brackets 253 to attach the first sensor 245 and the second sensor 250 to the associated mounting bracket 252, and to attach the first and second sensors 245, 250 indirectly to each other. After the sensor apparatus 210 is assembled, the axes of the first sensor 245 and the second sensor 250 are aligned with the duct centerline 225, and are further aligned with each other. Generally, the first sensor 245 and the second sensor 250 are removable from the duct 215 to repair or replace the sensors as necessary, or as desired.

Generally, operation of the sensor apparatus 210 illustrated in FIGS. 10 and 11 is substantially the same as the operation of the sensor apparatus 10 in FIGS. 1-9. As such, the description of operation of the sensor apparatus 10 in FIGS. 1-9 is exemplary of and generally applicable to the description of operation of the sensor apparatus 210 in FIGS. 10 and 11. Therefore, operation of the sensor apparatus 210 in FIGS. 10 and 11 will not be described in detail separately.

FIGS. 12-15 illustrate another sensor apparatus 300 for use with an air duct system (not shown) that has ducting to direct airflow to and/or from a controlled space to maintain the controlled space at predetermined conditions. The sensor apparatus 300 includes a duct 302 mat is attachable to the air duct system and that includes a perimeter wall that defies an enclosure of the sensor apparatus 300. The duct 302 is substantially the same as the duct 15 in FIGS. 1 and 2.

The sensor apparatus 300 further includes a sensor 306 that is assembled from seven parts. However, there are only two different types of parts used. More specifically, the sensor 306 utilizes three inner members 308 and four outer members 310. The members are assembled as shown in FIGS. 12 and 13 to produce a dual-port sensor, as described below in more detail.

Figure 12:
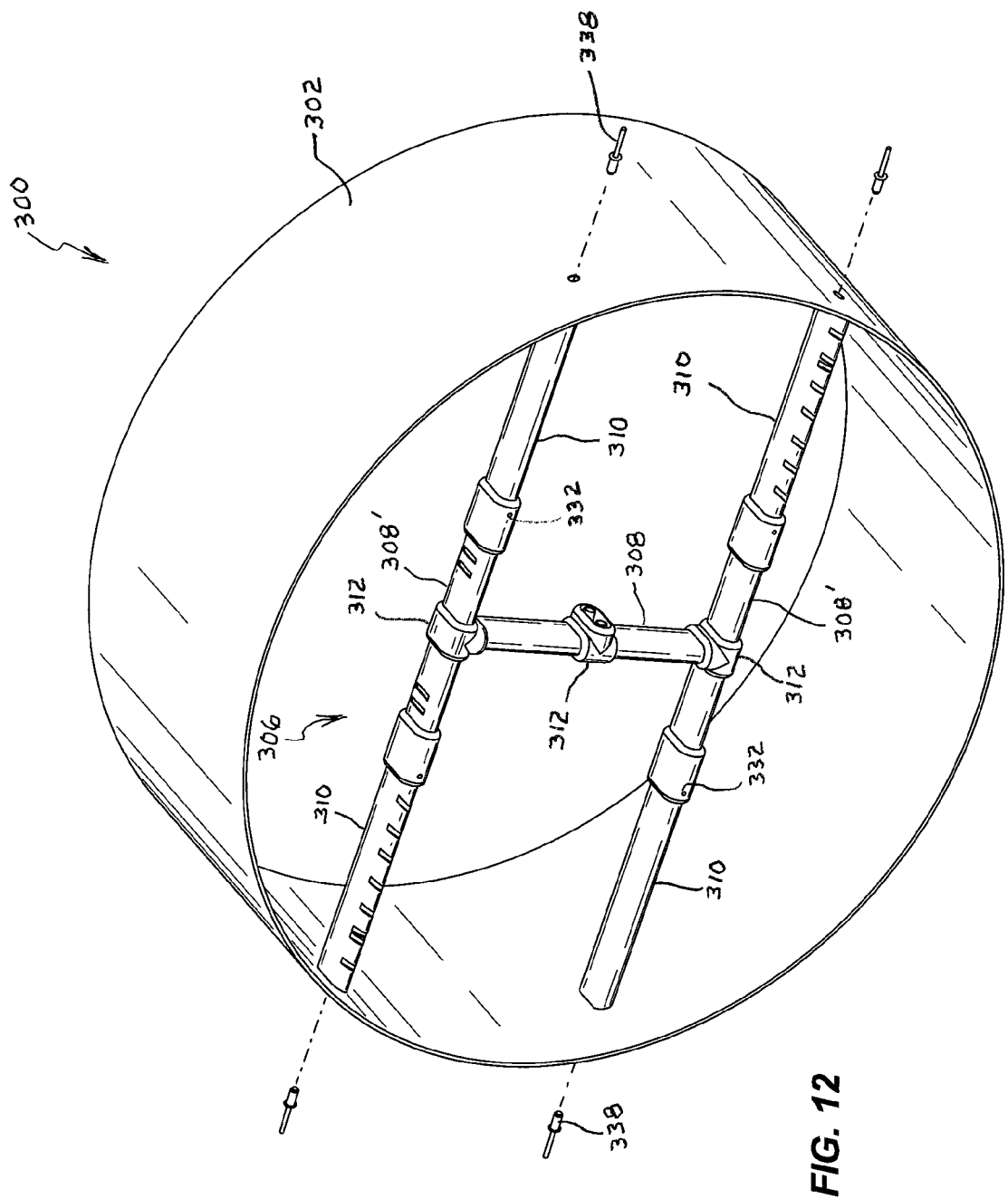
FIG. 12 is a perspective view of another sensor apparatus embodying aspects of the present invention.
Figure 13:
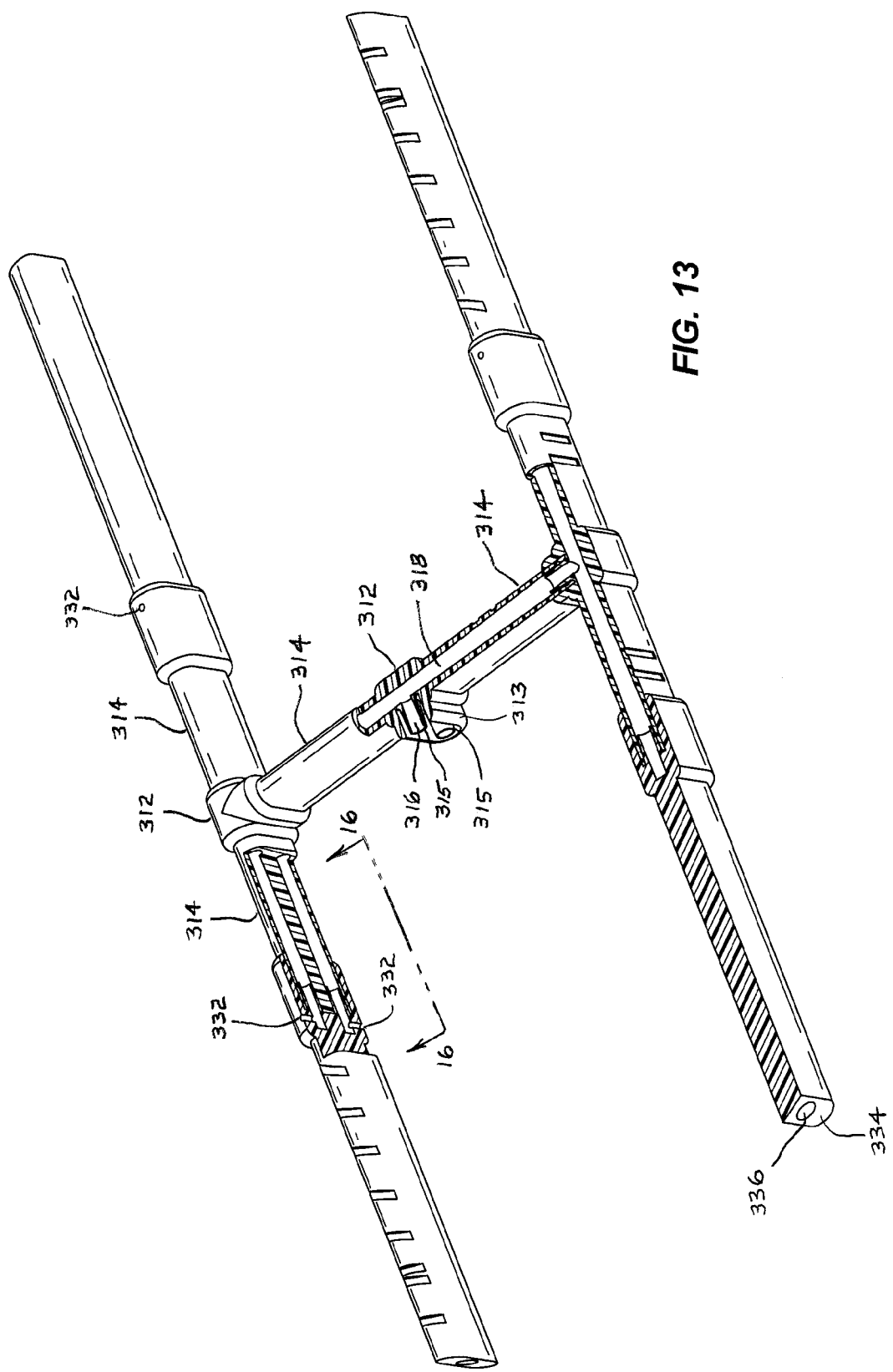
FIG. 13 is a partially-sectioned perspective of a sensor used in the apparatus of FIG. 12.
Figure 14:
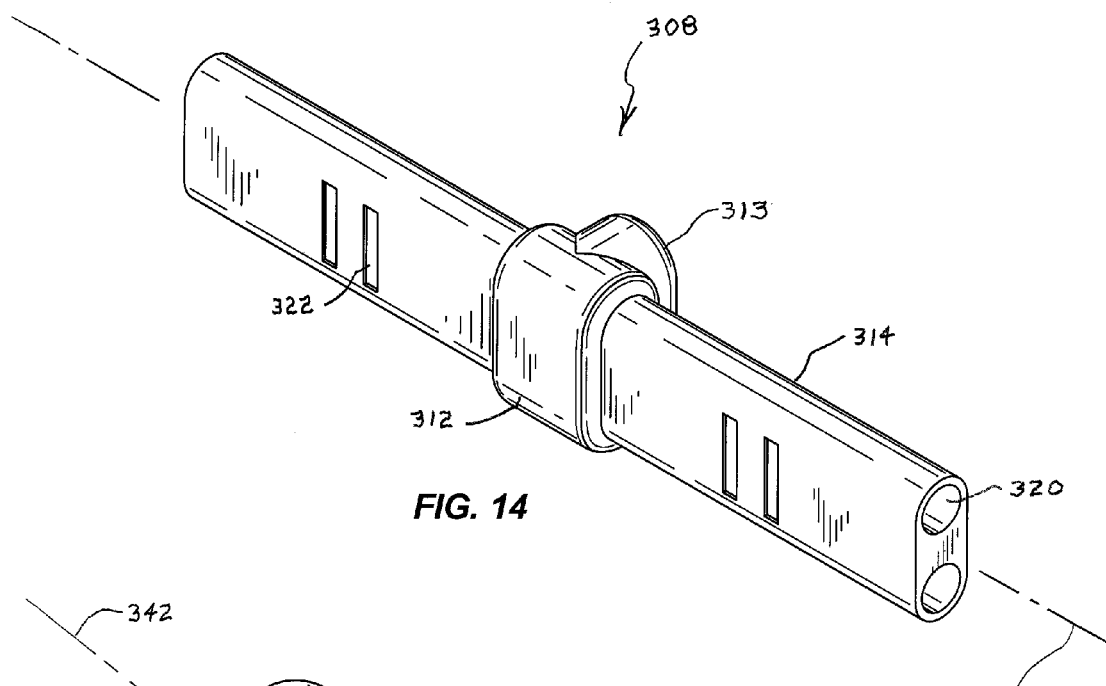
FIG. 14 is a perspective view of an inner member used in the sensor of FIG. 13.

Referring to FIGS. 12-14, each inner member 308 comprises a central hub 312 and two lateral tubes 314. The hub 312 includes a receiving wall 313 having an interior that is dimensioned to receive an end of a lateral tube 314. The hub 312 further includes two receiving tubes 315 defining two center ports 316 that each leads to an internal T-shaped passage 318 that extends into the lateral tubes 314 and terminates at two lateral ports 320. The T-shaped passages 318 do not communicate with each other. In the preferred embodiment, the receiving wall 313 and receiving tubes 315 are dimensioned to mate securely with the end of a lateral tube 314 of another inner member 308 as a press fit in such a manner than no additional fastening (e.g., fasteners, glue, tape, welding, etc.) is required to hold the two parts together. In addition, the receiving wall 313 and receiving tubes 315 provide contact with both the interior and exterior of a corresponding end of a later tube 314 to enhance the structural integrity of the joint and to create a labyrinth seal having at least one sharp change of direction (e.g., at least about 120 degrees).

The inner member 308 further includes a series of notches 322 on an exterior surface. The notches 322 are perpendicular to a longitudinal axis 324 of the lateral tube 314 in order to provide visual and structural guidance for cutting the lateral tube 314. Such cutting may be desired for purposes of reducing the size of the inner members 308 for use in a smaller conduit.

Figure 15:
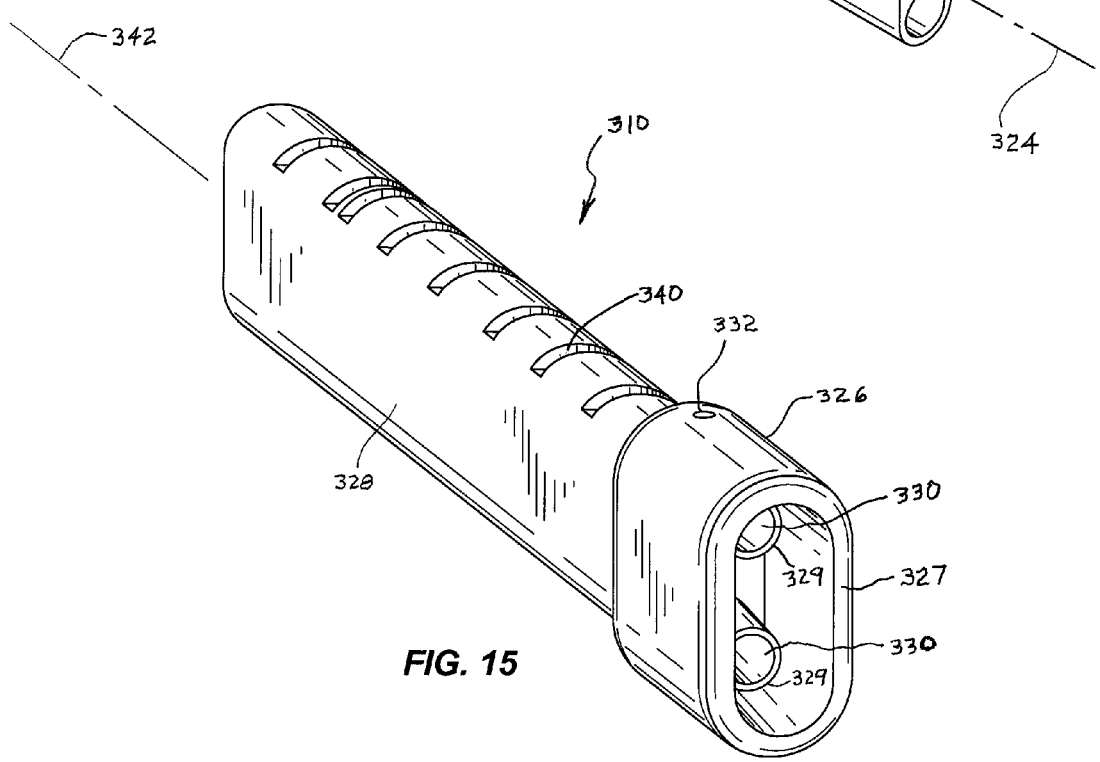
FIG. 15 is a perspective view of an outer member used in the sensor of FIG. 12.
Figure 16:
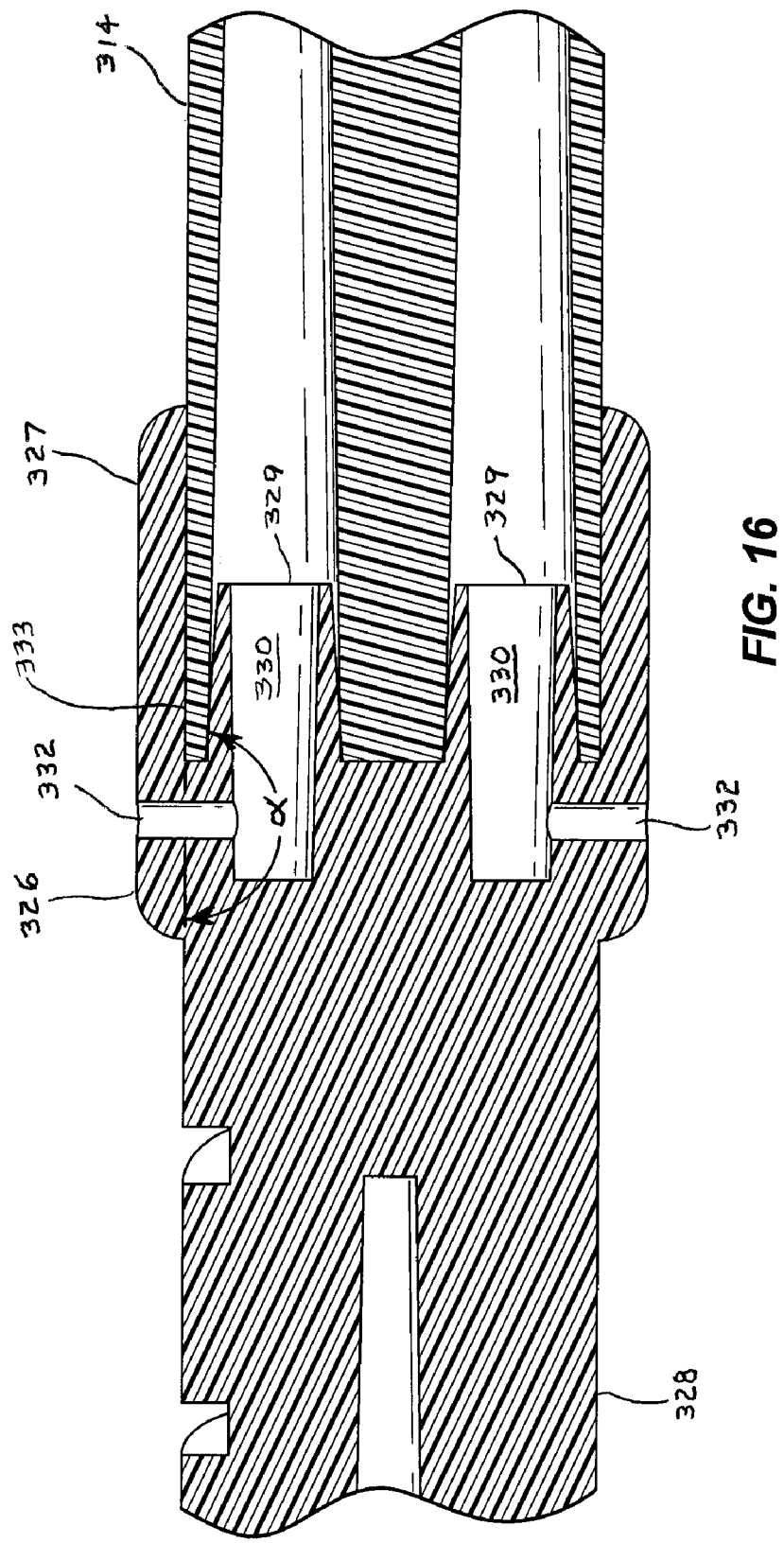
FIG. 16 is an enlarged section view taken from line 16-16 in FIG. 13.

Referring to FIGS. 13 and 15, each outer member 310 includes an end housing 326 and a lateral support 328. The housing 326 includes a receiving wall 327 having an interior that is dimensioned to receive an end of a lateral tube 314. The housing 326 further includes two receiving tubes 329 defining two interior ports 330 that each fluidly communicates with an exterior pressure port 332. Each interior port 330 and its corresponding pressure port 332 are fluidly isolated from the other interior port 330 and its corresponding pressure port 332. In the preferred embodiment, the receiving wall 327 and receiving tubes 329 are dimensioned to mate securely with the end of a lateral tube 314 of an inner member 308 in such a manner than no additional fastening (e.g., fasteners, glue, tape, welding, etc.) is required to hold the two parts together. In addition, referring to FIG. 16, the receiving wall 327 and receiving tubes 329 provide contact with both the interior and exterior of a corresponding end of a later tube 314 to enhance the structural integrity of the joint and to create a labyrinth seal 333 having at least one sharp change of direction at an angle $\alpha$ (e.g., at least about 120 degrees). In the illustrated embodiment, the angle $\alpha$ is about 178 degrees.

Each lateral support 328 extends from the corresponding housing 326 in order to provide a means for supporting the assembled apparatus 300 in a conduit. The lateral support 328 includes a free end 334 defining an opening 336 into which a fastener 338 can be inserted to secure the apparatus 300 in the duct 302.

The lateral support 328 further includes a series of notches 340 on an exterior surface. The notches 340 are angled relative to a longitudinal axis 342 of the lateral support 328 in order to provide visual and structural guidance for cutting the lateral supports. Such cutting may be desired for purposes of reducing the size of the lateral supports for use in a smaller conduit.

As shown in FIG. 12, assembly of the apparatus 300 starts with an inner member 308 located near the center of the apparatus 300. The inner member 308 can be cut to the desired size by utilizing the notches 322 for guidance. The free end of each lateral tube 314 of this inner member 308 is inserted into a hub 312' of another inner member 308' to produce an H-shaped structure. These additional two inner members 308' can be cut to the desired size by utilizing the notches 322' for guidance. As noted above, the inner members are held together by frictional engagement, but could instead by secured by any suitable means, such as bonding, melting, welding, threading, gluing, taping, etc.

After the H-shaped structure is formed, an outer member 310 is placed onto each of the four free ends of the lateral tubes 314' by inserting each free end into a corresponding end housing 326 to produce a larger H-shaped structure. The lateral support 328 of each end housing 326 can be cut to the desired size by utilizing the notches 340 for guidance. As noted above, the lateral tubes 314' to the end housings 326 are held together by frictional engagement, but could instead by secured by any suitable means, such as bonding, melting, welding, threading, gluing, taping, etc.

The resulting larger H-shaped structure is then inserted into the duct 302 and secured in place by inserting fasteners 338 through the duct and into the openings 336 of the free ends of the supports 328. Pressure readings can be taken by attaching a suitable conduit (such as the conduit 112 of FIG. 1) to the hub 312 of the inner member 308 located near the center of the apparatus.

Various features and advantages of the invention are set forth in the following claims.

What is claimed is:

1. A sensor apparatus for measuring a pressure of an airflow in an air duct system having a duct, the duct including a perimeter wall defining a centerline of the duct extending longitudinally through the duct, the sensor apparatus comprising:
    a first sensor portion including a first end and a second end, the first sensor portion without ports in communication with the airflow,
    a second sensor portion coupled to the first sensor portion adjacent the first end, the second sensor portion including a first port operable to sense a first airflow pressure of the airflow, and a second port operable to sense a second airflow pressure of the airflow, and
    a third sensor portion coupled to the first sensor portion adjacent the second end of the first sensor portion, the third sensor portion including a third port operable to sense a third airflow pressure of the airflow, and a fourth port operable to sense a fourth airflow pressure of the airflow.

2. The sensor apparatus of claim 1, wherein the first port, the second port, the third port, and the fourth port are spaced substantially equidistant from the duct centerline when mounted in a duct.

3. The sensor apparatus of claim 1, wherein the sensor further includes:
    a first pressure averaging portion in communication with the first port and the second port to average the first airflow pressure and the second airflow pressure in the second sensor portion, and
    a second pressure averaging portion in communication with the third port and the fourth port to average the third airflow pressure and the fourth airflow pressure in the third sensor portion.

4. The sensor apparatus of claim 3, wherein the sensor further includes a third pressure averaging portion positioned adjacent a center of the first sensor portion in communication with the first pressure averaging portion and the second pressure averaging portion to average the airflow pressure from the second sensor portion and the airflow pressure from the third sensor portion.

5. The sensor apparatus of claim 1, wherein each of the second sensor portion and the third sensor portion extends at a non-zero angle relative to the first sensor portion.

6. The sensor apparatus of claim 1, wherein the second sensor portion extends substantially perpendicular to the first sensor portion, and wherein the third sensor portion extends substantially perpendicular to the first sensor portion and substantially parallel to the second sensor portion.

7. A sensor apparatus for measuring a pressure of an airflow in an air duct system, the sensor apparatus comprising:
    a duct defined by an upstream side and a downstream side and including a perimeter wall defining a centerline of the duct extending longitudinally through the duct;
    a first sensor defining a first axis and including a curved surface profile positioned in communication with the airflow adjacent the upstream side of the duct, the first sensor further including a substantially planar surface profile defining a back of the first sensor and disposed opposite the curved surface profile, and a first plurality of ports disposed in the curved surface profile in communication with the airflow to sense airflow pressures; and
    a second sensor positioned adjacent the first sensor, the second sensor defining a second axis and including a curved surface profile positioned in communication with the airflow adjacent the downstream side of the duct, the second sensor further including a substantially planar surface profile defining a back of the second sensor and disposed opposite the curved surface profile, the first sensor and the second sensor positioned adjacent each other in back-to-back relationship within the duct, the second sensor further including a second plurality of ports in communication with the airflow to sense airflow pressures.

8. The sensor apparatus of claim 7, wherein each of the first plurality of ports are spaced equidistant from the first axis, and wherein each of the second plurality of ports are spaced equidistant from the second axis.

9. The sensor apparatus of claim 7, wherein each of the first sensor and the second sensor is defined by a substantially H-shaped cross section.

10. The sensor apparatus of claim 9, wherein each of the first sensor and the second sensor includes a first sensor portion without ports in communication with the airflow, a second sensor portion that is coupled to the first sensor portion, and a third sensor portion that is coupled to the first sensor portion.

11. The sensor apparatus of claim 7, wherein the shortest distance from each of the first axis and the second axis to the perimeter wall is defined as a radius of the duct, and wherein each of the first plurality of ports and the second plurality of ports are spaced inward from the perimeter wall by a distance that is equal to at least 20 percent of the corresponding radius.

12. The sensor apparatus of claim 7, wherein the first sensor is a total pressure sensor, and wherein the second sensor is a static pressure sensor.

13. A sensor apparatus for measuring a pressure of an airflow in an air duct system having a duct, the duct including a perimeter wall defining a centerline of the duct extending longitudinally through the duct, the sensor apparatus comprising:
    a first inner member including a central hub and two ends;
    a second inner member including a central hub and two ends, the central hub of the second inner member being attached to one end of the first inner member;
    a third inner member including a central hub and two ends, the central hub of the third inner member being attached to the other end of the first inner member;
    a first outer member including an end housing and a port operable to sense a first airflow pressure of the airflow, the end housing of the first outer member being coupled to one of the ends of the second inner member;
    a second outer member including an end housing and a port operable to sense a second airflow pressure of the airflow, the end housing of the second outer member being coupled to the other of the ends of the second inner member;
    a third outer member including an end housing and a port operable to sense a third airflow pressure of the airflow, the end housing of the third outer member being coupled to one of the ends of the third inner member;
    a fourth outer member including an end housing and a port operable to sense a fourth airflow pressure of the airflow, the end housing of the fourth outer member being coupled to the other of the ends of the third inner member.

14. The sensor apparatus of claim 13, where the first, second, and third inner members have substantially the same dimensions.

15. The sensor apparatus of claim 13, where the first, second, third, and fourth outer members have substantially the same dimensions.

16. The sensor apparatus of claim 13, wherein at least two of the members are press fit to each other to form a press fit joint.

17. The sensor apparatus of claim 16, wherein the press fit joint creates a labyrinth seal having at least one change of direction of at least 120 degrees.

18. The sensor apparatus of claim 16, wherein the press fit joint creates a labyrinth seal having at least one change of direction of at least 170 degrees.

19. The sensor apparatus of claim 13, wherein all of the members are press fit to each other.

20. The sensor apparatus of claim 13, wherein at least one of the members includes a series of notches to facilitate cutting the member to a shorter length.

* * * * *